US012437586B2

(12) United States Patent
Wakamatsu et al.

(10) Patent No.: US 12,437,586 B2
(45) Date of Patent: Oct. 7, 2025

(54) VEHICLE

(71) Applicants: TOYOTA JIDOSHA KABUSHIKI KAISHA, Toyota (JP); SUMITOMO WIRING SYSTEMS, LTD., Yokkaichi Mie (JP)

(72) Inventors: Yasunori Wakamatsu, Nagakute (JP); Masatoshi Ishino, Nagakute (JP); Yuuki Arai, Toyota (JP); Takafumi Eguchi, Aichi-ken (JP); Akihiro Kusada, Yokkaichi (JP)

(73) Assignees: TOYOTA JIDOSHA KABUSHIKI KAISHA, Toyota (JP); SUMITOMO WIRING SYSTEMS, LTD, Yokkaichi Mie (JP)

( * ) Notice: Subject to any disclaimer, the term of this patent is extended or adjusted under 35 U.S.C. 154(b) by 158 days.

(21) Appl. No.: 18/374,790

(22) Filed: Sep. 29, 2023

(65) Prior Publication Data
US 2024/0112509 A1 Apr. 4, 2024

(30) Foreign Application Priority Data
Oct. 3, 2022 (JP) .................................. 2022-159536

(51) Int. Cl.
*G07C 5/02* (2006.01)
*B60Q 3/78* (2017.01)
*B60Q 3/80* (2017.01)

(52) U.S. Cl.
CPC ................. *G07C 5/02* (2013.01); *B60Q 3/78* (2017.02); *B60Q 3/80* (2017.02)

(58) Field of Classification Search
CPC ............... G07C 5/02; B60Q 3/78; B60Q 3/80
See application file for complete search history.

(56) References Cited

U.S. PATENT DOCUMENTS 11,041,734 B2 * 6/2021 Cyr .................... G01C 21/3415
12,172,530 B2 * 12/2024 Aslandere .......... G01C 21/3461
2018/0312106 A1 * 11/2018 Tatara ...................... B60Q 1/32
2022/0001852 A1 1/2022 Kageura et al.

FOREIGN PATENT DOCUMENTS

JP 2022-013179 A 1/2022

* cited by examiner

*Primary Examiner* — Gertrude Arthur Jeanglaude
(74) *Attorney, Agent, or Firm* — Dinsmore & Shohl LLP

(57) ABSTRACT

A vehicle is a vehicle that is equipped with an illumination device in a vehicle cabin and that is capable of traveling in an EV mode, the vehicle being configured to change a manner of luminescence of the illumination device when the vehicle enters a low emission zone (LEZ) where the vehicle needs to travel in the EV mode, and to cause a driver to perceive the entrance. For the change in the manner of the luminescence, for example, the color of the luminescence of the illumination device may be changed from a regular color to a specific color. By the change in the manner of the luminescence of the illumination device, it is possible to cause the driver to sensorily recognize the entrance to the low emission zone.

7 Claims, 3 Drawing Sheets

FIG. 1A
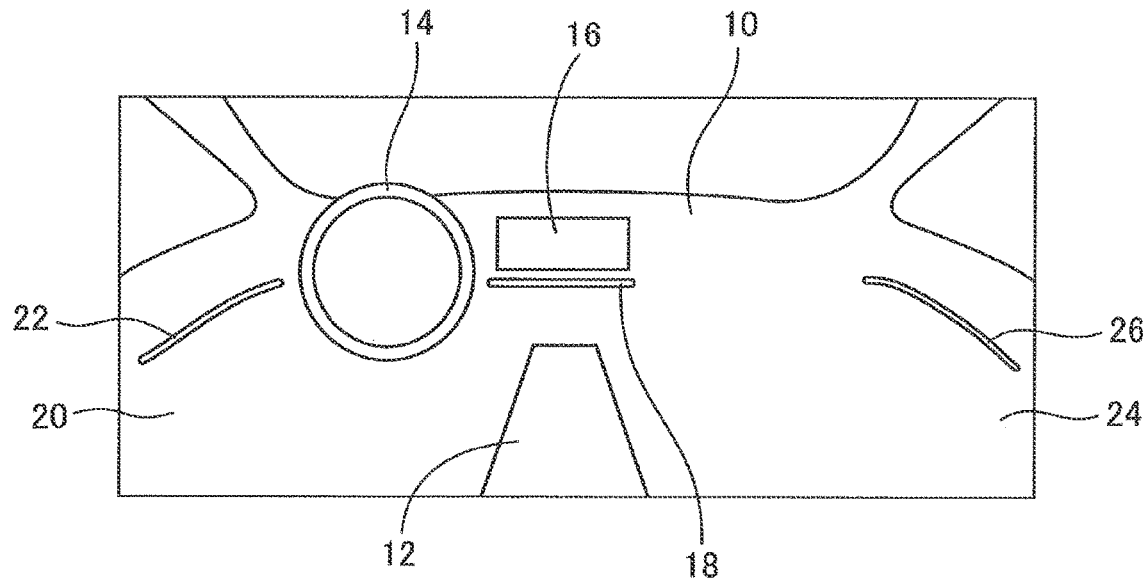
FIG. 1B
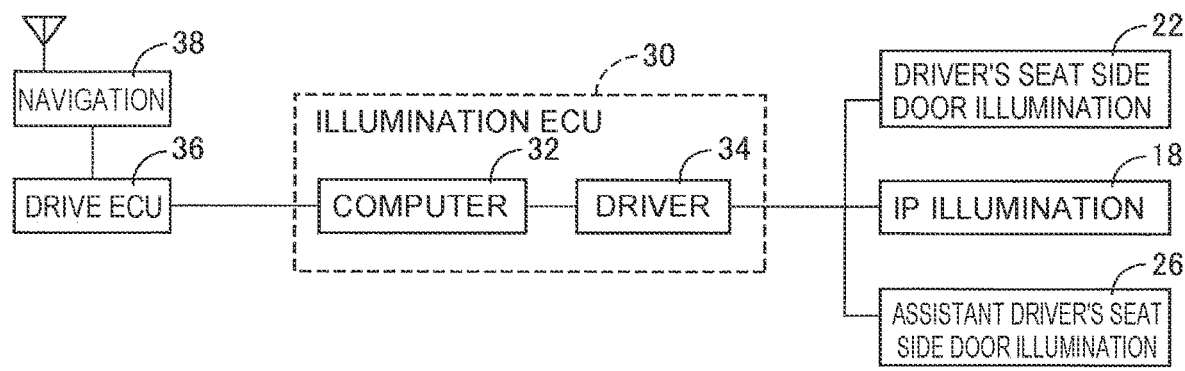
FIG. 1C
| VEHICLE SPEED | LOW ← SET LOW VEHICLE SPEED   SET HIGH VEHICLE SPEED → HIGH | | |
|---|---|---|---|
| ILLUMINATION COLOR | BLUE | ← INTERMEDIATE COLOR → | RED |

VEHICLE

CROSS-REFERENCE TO RELATED APPLICATION

This application claims priority to Japanese Patent Application No. 2022-159536 filed on Oct. 3, 2022, incorporated herein by reference in its entirety.

BACKGROUND

1. Technical Field

The present disclosure relates to a vehicle that is equipped with an illumination device in a vehicle cabin.

2. Description of Related Art

For example, a hybrid electric vehicle including an internal combustion engine and an electric motor as drive sources travels in a mode (also referred to as "EV mode" hereinafter) in which the drive by the internal combustion engine is prohibited and the drive is performed by the electric motor. Meanwhile, in consideration of atmospheric pollution and the like, a so-called low emission zone (also referred to as "LEZ" hereinafter) where the internal combustion engine is required to be stopped is set in some cases. In Japanese Unexamined Patent Application Publication No. 2022-13179 (JP 2022-13179 A), when the vehicle enters an LEZ, a text message is displayed on a display in the vehicle, and thereby a driver is notified of the entrance to the LEZ.

SUMMARY

In the vehicle described in JP 2022-13179 A, the driver is notified of the entrance to the LEZ through the text message, but there is concern of the driver not noticing or the like. Therefore, it is desirable to cause the driver to sensorily recognize the entrance to the LEZ. Presently, there is a vehicle that includes an illumination device in a vehicle cabin. The inventor has found that it is possible to sensorily notify the driver of the entrance to the LEZ and to thereby improve the practicality of the vehicle, by using the illumination device. The present disclosure has been made based on this knowledge, and has an object to provide a vehicle having high practicality.

For solving the above problem, a vehicle in the present disclosure is a vehicle that is equipped with an illumination device in a vehicle cabin and that is capable of traveling in an EV mode, the vehicle being configured to change a manner of luminescence of the illumination device when the vehicle enters a low emission zone where the vehicle needs to travel in the EV mode, and to cause a driver to perceive the entrance.

With the vehicle in the present disclosure, it is possible to cause the driver to sensorily recognize the entrance to the low emission zone.

The "illumination device" can be thought to be a device that is provided with a physical body to radiate light at a particular place in the vehicle cabin and that creates a particular ambience in the vehicle cabin with the light radiated by the physical body. The specific configuration is not particularly limited. For example, it is allowable to adopt a configuration in which an LED is linearly or planarly disposed on an instrument panel, a center console, a door, a ceiling, a seat, or the like and the LED is controlled by a control device. For example, the "change of the manner of luminescence" means a temporal change in the color, brightness (luminance), gradation, and others of the light that is radiated. The specific change is not particularly limited, and only needs to be a change that allows the driver to perceive the entrance to the LEZ without giving the driver a surprise or feeling of discomfort.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1A is a diagram for describing the configuration of an illumination device that is equipped in a vehicle in the present disclosure;

FIG. 1B is a diagram for describing a regular control of the illumination device that is equipped in the vehicle in the present disclosure;

FIG. 1C is a table for describing the regular control of the illumination device that is equipped in the vehicle in the present disclosure;

DETAILED DESCRIPTION OF EMBODIMENTS

Figure 2A:
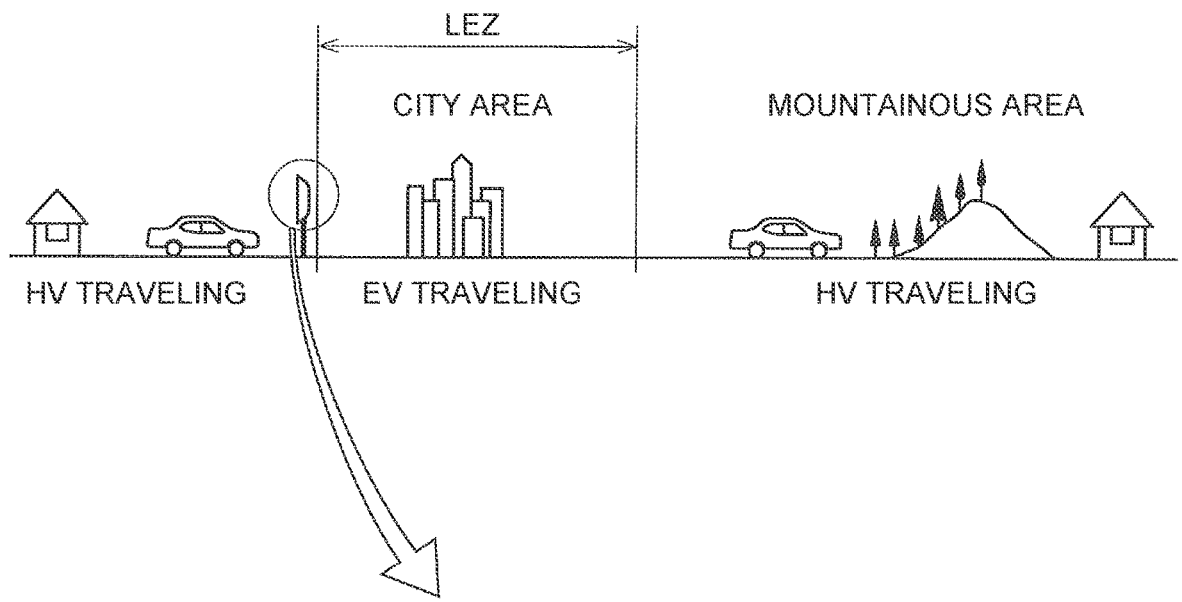
FIG. 2A. is a diagram for describing the entrance of the vehicle to a low emission zone and the change in the manner of the luminescence of the illumination device at the time of the entrance.

As an embodiment of the present disclosure, a vehicle of the embodiment will be described below in detail with reference to the drawings. The present disclosure can be carried out as various modes in which various alterations and improvements are performed based on the knowledge of a person skilled in the art, in addition to the following embodiment.

[A] Configuration and Basic Control about Illumination Device

As schematically shown in FIG. 1A, in the vehicle in the embodiment, an illumination device is equipped in a vehicle cabin, so as to be divided into three portions. More specifically, on an instrument panel (sometimes abbreviated as "IP" hereinafter) 10, a monitor 16 is arranged at a portion that is above a center console 12 and that is on a center side of a steering wheel 14. An IP illumination 18 is arranged on a lower side of the monitor 16, a driver's seat side door illumination 22 is arranged on a driver's seat side door 20, and an assistant driver's seat side door illumination 26 is arranged on an assistant driver's seat side door 24. The IP illumination 18, the driver's seat side door illumination 22, and the assistant driver's seat side door illumination 26 constitute one illumination device. The IP illumination 18, the driver's seat side door illumination 22, and the assistant driver's seat side door illumination 26 are collectively referred to as the illuminations 18, 22, 26. Each of the illuminations 18, 22, 26 is formed such that a plurality of LED elements is disposed so as to be arrayed on a line.

As shown in a block diagram of FIG. 1B, the illuminations 18, 22, 26 are controlled by an illumination electronic control unit (also referred to as "illumination ECU" hereinafter) 30. The illumination ECU 30 is configured to include a computer 32 including a CPU, a ROM, a RAM, an input-output interface (I/O), and the like, and a driver (drive circuit) 34 for the illuminations 18, 22, 26. The vehicle includes an electric motor and a gasoline engine as drive sources, and includes a vehicle drive electronic control unit (also referred to as "vehicle drive ECU" hereinafter) 36 for controlling the drive of the vehicle by controlling the drive sources. The vehicle drive ECU 36 can cause the vehicle to travel while selectively performing switching between a mode (also referred to as "HV mode" hereinafter) in which the vehicle is driven using both of the electric motor and the gasoline engine and a mode (also referred to as "EV mode" hereinafter) in which the vehicle is driven using only the electric motor. Further, the vehicle includes a car navigation system 38 including a GPS antenna. The car navigation system 38 is connected to the vehicle drive ECU 36, and the vehicle drive ECU 36 is connected to the illumination ECU 30.

As shown in a table of FIG. 1C, a regular control of the illumination device of the vehicle is performed based on the traveling speed (also referred to as "vehicle speed" hereinafter) of the vehicle. More specifically, the illumination ECU 30 lights the illuminations 18, 22, 26 in blue in the case where the vehicle speed is equal to or lower than a set low vehicle speed (for example, 20 km/h), and lights the illuminations 18, 22, 26 in red in the case where the vehicle speed is equal to or higher than a set high vehicle speed (for example, 60 km/h). In the case where the vehicle speed is higher than the set low vehicle speed and is lower than the set high vehicle speed, the lighting color of the illuminations 18, 22, 26 is set to an intermediate color between blue and red, so as to be closer to blue as the vehicle speed is lower and be closer to red as the vehicle speed is higher. The vehicle speed is acquired based on a signal that is sent from the vehicle drive ECU 36.

[B] Low Emission Zone and Entrance to Low Emission Zone

In recent years, in consideration of atmospheric pollution and the like, traveling by a gasoline engine is prohibited in urban areas and the like, in some cases. In plain words, for example, as shown in FIG. 2A, a city area is set as a low emission zone (also referred to as "LEZ" hereinafter). The traveling in the HV mode (also referred to as "HV traveling" hereinafter) is permitted outside of the LEZ, for example, in a mountainous area, but only the traveling in the EV mode (also referred to as "EV traveling" hereinafter) is permitted inside the LEZ.

Figure 2B:
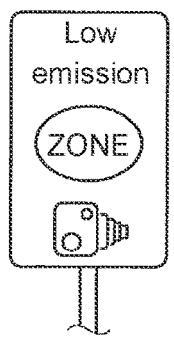
FIG. 2B is a diagram for describing the entrance of the vehicle to a low emission zone and the change in the manner of the luminescence of the illumination device at the time of the entrance.

Hence, when the vehicle enters the LEZ, the vehicle drive ECU 36 detects the entrance from the car navigation system 38 based on the GPS communication, and the vehicle drive ECU 36 switches the traveling mode of the vehicle from the HV mode to the EV mode, based on the detection of the entrance. In this way, the switching of the traveling mode is automatically performed. It is desirable for the driver to recognize that the vehicle has entered the LEZ, for accepting the change in vehicle traveling state due to the switching. Generally, only a traffic sign shown in FIG. 2B, or the like is installed on a road. In the case of only the traffic sign, there is a high possibility that the driver does not notice the traffic sign. Further, even when a text indicating the entrance is displayed on the monitor 16 of the instrument panel 10 by the car navigation system 38, there is still a possibility of not noticing.

Figure 2C:
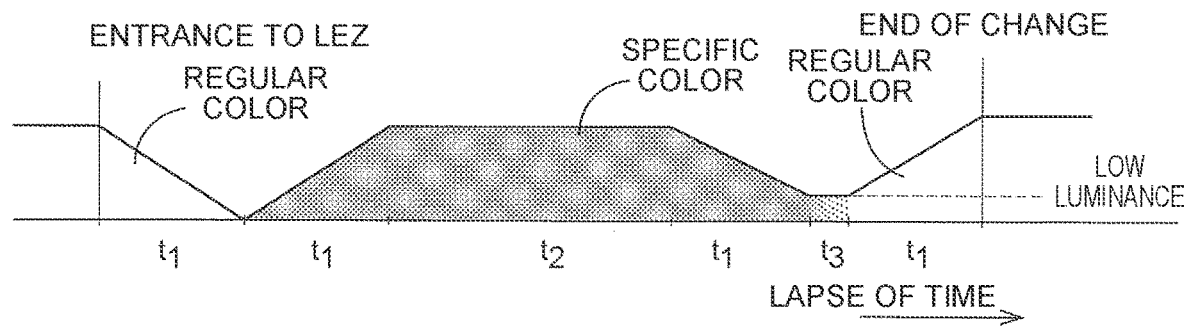
FIG. 2C is a diagram for describing the entrance of the vehicle to a low emission zone and the change in the manner of the luminescence of the illumination device at the time of the entrance.

In view of the above circumstances, in the vehicle, at the time of the entrance to the LEZ, the manner of luminescence of the illumination device is changed such that the driver sensorily recognizes the entrance to the LEZ. Briefly speaking, as shown in FIG. 2C, at the time of the entrance to the LEZ, the illumination ECU 30 switches the color of the illuminations 18, 22, 26 from a color (also referred to as "regular color") radiated by the above-described regular control to a specific color once, and thereafter, returns the color of the illuminations 18, 22, 26 to the regular color. More specifically, the regular color is eliminated by being gradually darkened from the time point of the entrance to the LEZ for fade time $t_1$ (for example, 0.9 seconds), and after the switching from the regular color to the specific color, the specific color is lightened for fade time $t_1$, to the same brightness as the brightness in the case of the regular color, that is, to a brightness of 100%. Then, this state is maintained for maintenance time $t_2$ (for example, 2 seconds), and thereafter, the specific color is dimmed for fade time $t_1$, to a low luminance (a brightness of 20%). Subsequently, while the brightness is maintained, the color is gradually changed from the specific color to the regular color for gradual change time $t_3$ (for example, 0.3 seconds). Thereafter, the regular color is brightened to a brightness of 100%. Incidentally, the specific color is set to green for a message indicating environmental protection.

Figure 3:
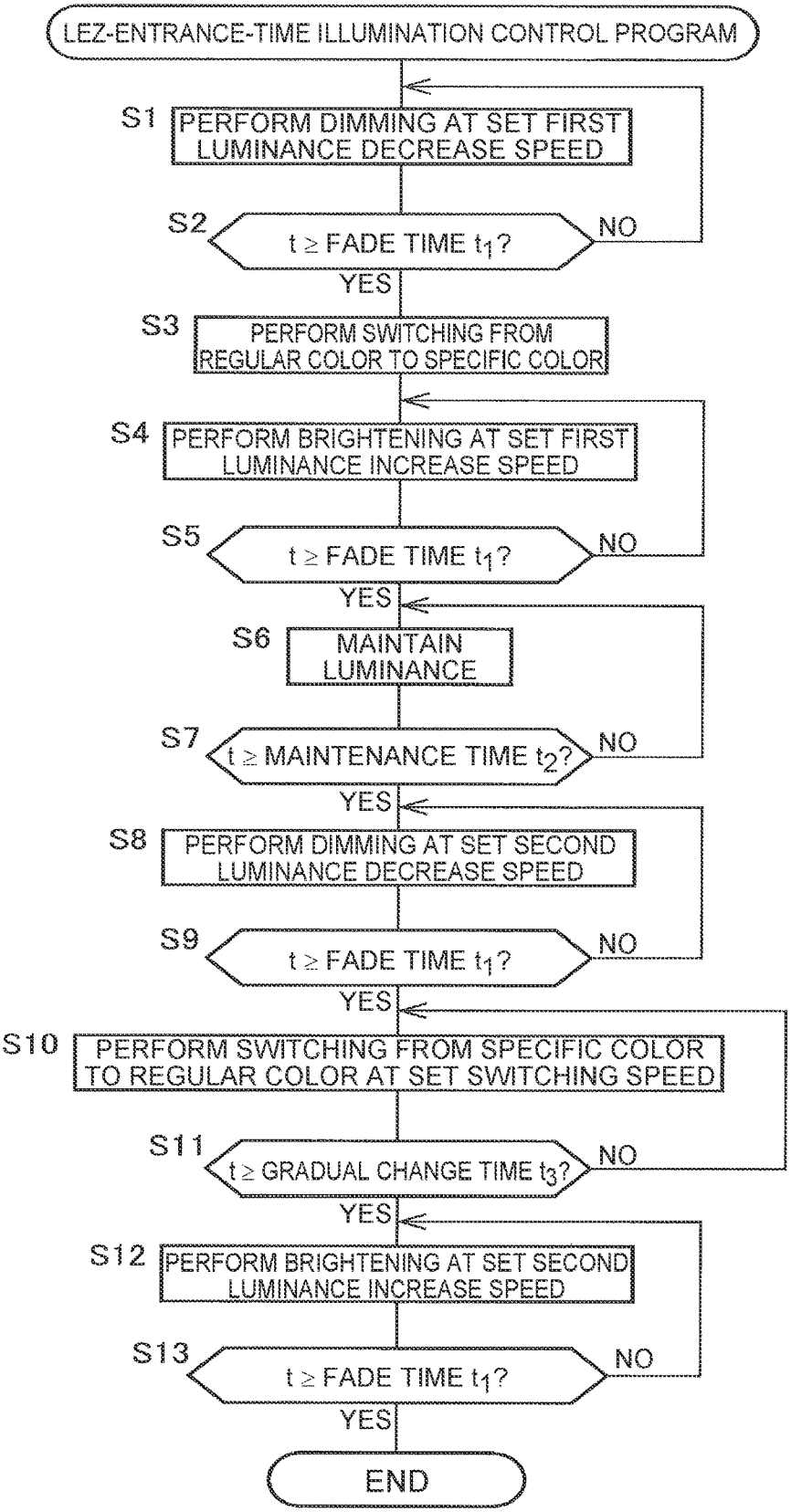
FIG. 3 is a flowchart of a program that is executed for changing the manner of the luminescence of the illumination device.

The above-described illumination control at the time of the entrance to the LEZ is referred to as an LEZ-entrance-time illumination control. This control is performed when the illumination ECU 30 executes an LEZ-entrance-time illumination control program shown by a flowchart of FIG. 3 at the timing of the entrance. Once again, a process in accordance with the program will be briefly described below.

In the process in accordance with the LEZ-entrance-time illumination control program, first, in step S1 (abbreviated as "S1" hereinafter; the same goes for the other steps), the illuminations 18, 22, 26 are dimmed at a set first luminance decrease speed. The set first luminance decrease speed is set to a speed at which the luminance is changed from 100% to 0% for fade time $t_1$. When it is determined in S2 that time t of the dimming has reached fade time $t_1$, the color of the luminescence of the illuminations 18, 22, 26 is switched from the regular color to the specific color in step S3. Subsequently, in S4, the illuminations 18, 22, 26 are brightened at a set first luminance increase speed. The set first luminance increase speed is set to a speed at which the luminance is changed from 0% to 100% for fade time $t_1$. When it is determined in S5 that time t of the brightening has reached fade time $t_1$, the luminance of the illuminations 18, 22, 26 is maintained in S6.

Then, when it is determined in S7 that time t during which the luminance is maintained has reached maintenance time $t_2$, the illuminations 18, 22, 26 are dimmed at a set second luminance decrease speed in S8. The set second luminance decrease speed is set to a speed at which the luminance is changed from 100% to the low luminance (for example, 20%) for fade time $t_1$. When it is determined in S9 that time t of the dimming has reached fade time $t_1$, the color of the luminescence of the illuminations 18, 22, 26 is switched from the specific color to the regular color at a set switching speed in S10. The set switching speed is set to a speed at which the color of the luminescence is completely switched for gradual change time $t_3$. When it is determined in S11 that time t during which the color is changed has reached gradual change time $t_3$, the illuminations 18, 22, 26 are brightened at a set second luminance increase speed in S12. The set second luminance increase speed is set to a speed at which the luminance is changed from the low luminance to 100% for fade time $t_1$. When it is determined in S13 that time t of the brightening has reached fade time $t_1$, the process for the program, that is, the process for changing the manner of the luminescence of the illuminations 18, 22, 26 ends.

What is claimed is:

1. A vehicle comprising:
   an illumination device in a vehicle cabin of the vehicle;
   a first electronic control unit configured to:
      determine whether the vehicle enters a low emission zone where the vehicle needs to travel in an EV mode, and
      change a driving mode of the vehicle to the EV mode in response to determining that the vehicle enters the low emission zone; and
   a second electronic control unit configured to change a manner of luminescence of the illumination device in response to the first electronic control unit determining that the vehicle enters the low emission zone.

2. The vehicle according to claim 1, further comprising a car navigation system,
   wherein the first electronic control unit is configured to determine whether the vehicle enters the low emission zone based on a GPS communication of the car navigation system.

3. The vehicle according to claim 1, wherein in response to the first electronic control unit determining that the vehicle enters the low emission zone, the second electronic control unit changes the manner of the luminescence of the illumination device by:
   dimming an illumination of the illumination device illuminating a first color at a preset first luminance decrease speed from 100% illumination to 0% illumination over a first preset time period;
   upon elapse of the first preset time period, switching the illumination of the illumination device from the first color to a second color, the second color different than the first color;
   brightening the illumination of the illumination device illuminating the second color at a preset first luminance increase speed from 0% illumination to 100% illumination over the first preset time period;
   maintaining the illumination of the illumination device illuminating the second color for a second preset time period;
   upon elapse of the second preset time period, dimming the illumination of the illumination device illuminating the second color at a set second luminance decrease speed from 100% illumination to a preset illumination over the first preset time period, the preset illumination being greater than 0% illumination;
   upon elapse of the first preset time period, switching the illumination of the illumination device from the second color to the first color at a set switching speed over a third preset time period; and
   upon elapse of the third preset time period, brightening the illumination of the illumination device illuminating the first color at a set second luminance increase speed from the preset illumination to 100% illumination over the first preset time period.

4. The vehicle according to claim 3, wherein the third preset time period is shorter than the first preset time period and the second preset time period, and the first preset time period is shorter than the second preset time period.

5. The vehicle according to claim 4, wherein the preset illumination is 20% illumination.

6. The vehicle of claim 1, wherein the illumination device is disposed on at least one of an instrument panel and a door of the vehicle.

7. The vehicle of claim 1, further comprising a car navigation system in communication with the illumination device, the car navigation system configured to detect the vehicle entering the low emission zone and correspondingly change the manner of luminescence of the illumination device.

* * * * *